United States Patent
Ifrah et al.

(10) Patent No.: US 9,901,915 B2
(45) Date of Patent: Feb. 27, 2018

(54) COMPOSITION INCLUDING A LANTHANUM PEROVSKITE ON AN ALUMINA OR ALUMINUM OXYHYDROXIDE SUBSTRATE, PREPARATION METHOD AND USE IN CATALYSIS

(71) Applicant: RHODIA OPERATIONS, Paris (FR)

(72) Inventors: Simon Ifrah, La Jarrie (FR); Olivier Larcher, Perigny (FR); Rui Jorge Coelho Marques, LaRochelle (FR); Michael Lallemand, Saint Denis (FR); Julien Hernandez, Antony (FR)

(73) Assignee: Rhodia Operations, Paris (FR)

( * ) Notice: Subject to any disclaimer, the term of this patent is extended or adjusted under 35 U.S.C. 154(b) by 0 days.

(21) Appl. No.: 14/613,941

(22) Filed: Feb. 4, 2015

(65) Prior Publication Data
US 2015/0148219 A1 May 28, 2015

Related U.S. Application Data

(63) Continuation of application No. 13/254,151, filed as application No. PCT/EP2010/052381 on Feb. 25, 2010, now Pat. No. 8,974,764.

(30) Foreign Application Priority Data

Mar. 2, 2009 (FR) ...................... 09 00929

(51) Int. Cl.
*B01J 35/02* (2006.01)
*B01J 23/00* (2006.01)
(Continued)

(52) U.S. Cl.
CPC ............ *B01J 35/026* (2013.01); *B01J 21/04* (2013.01); *B01J 23/002* (2013.01); *B01J 23/10* (2013.01);
(Continued)

(58) Field of Classification Search
CPC . B01J 35/026; B01J 21/04; B01J 23/10; B01J 23/34; B01J 23/002; B01J 37/031;
(Continued)

(56) References Cited

U.S. PATENT DOCUMENTS 4,738,946 A  4/1988 Yamashita et al.
5,185,311 A  2/1993 Tabata et al.
(Continued)

FOREIGN PATENT DOCUMENTS

FR  2756270 A1  5/1998

OTHER PUBLICATIONS

Labhsetwar, N., et al—"Alumina Supported, Perovskite Oxide Based Catalytic Materials and Their Auto-Exhaust Application", Applied Catalysis B: Environmental, Sep. 28, 2001, pp. 165-173, vol. 33, Issue No. 2.
(Continued)

*Primary Examiner* — Anthony J Zimmer

(57) ABSTRACT

The composition according to the invention includes a perovskite of the formula $LaMO_3$, where M is at least one element selected from among iron, aluminium or manganese, in the form of particles dispersed on an alumina or aluminium oxyhydroxide substrate, characterized in that after calcination at 700° C. for 4 hours, the perovskite is in the form of a pure crystallographic phase, and in that the size of the perovskite particles does not exceed 15 nm. The composition according to the invention can be used in the field of catalysis.

15 Claims, 1 Drawing Sheet

(51) Int. Cl.
| | |
|---|---|
| *B01J 23/10* | (2006.01) |
| *B01J 23/34* | (2006.01) |
| *B01J 23/83* | (2006.01) |
| *B01J 35/00* | (2006.01) |
| *B01J 37/03* | (2006.01) |
| *B01J 21/04* | (2006.01) |
| *B82Y 30/00* | (2011.01) |
| *C01G 45/12* | (2006.01) |
| *C01G 49/00* | (2006.01) |
| *C04B 35/26* | (2006.01) |

(52) U.S. Cl.
CPC ............... *B01J 23/34* (2013.01); *B01J 23/83* (2013.01); *B01J 35/006* (2013.01); *B01J 37/031* (2013.01); *B82Y 30/00* (2013.01); *C01G 45/1264* (2013.01); *C01G 49/0054* (2013.01); *C04B 35/2675* (2013.01); *B01J 2523/00* (2013.01); *C01P 2002/34* (2013.01); *C01P 2002/72* (2013.01); *C01P 2004/64* (2013.01); *C04B 2235/3208* (2013.01); *C04B 2235/3227* (2013.01); *C04B 2235/3229* (2013.01); *Y02C 20/10* (2013.01)

(58) Field of Classification Search
CPC ...... B01J 35/006; B01J 23/83; B01J 2523/00; C04B 35/2675; C04B 2235/3229; C04B 2235/3227; C04B 2235/3208; C01G 45/1264; C01G 49/0054; B82Y 30/00; Y02C 20/10; C01P 2002/34; C01P 2002/72; C01P 2004/64
USPC .............. 502/303, 324, 336, 355; 423/593.1, 423/549.1, 599, 600
See application file for complete search history.

(56) References Cited

U.S. PATENT DOCUMENTS

| | | |
|---|---|---|
| 5,830,822 A | 11/1998 | Euzen |
| 5,899,679 A | 5/1999 | Euzen et al. |
| 6,464,953 B1 | 10/2002 | MacAudiere et al. |
| 7,205,257 B2* | 4/2007 | Tanaka ................ B01D 53/945 502/302 |
| 2006/0257305 A1 | 11/2006 | Yang |
| 2009/0023580 A1* | 1/2009 | Tanaka ................ B01D 53/945 502/171 |

OTHER PUBLICATIONS

Syskakis, E., et al—"Structural and High Temperature Electrical Properties of Lay-xSRxMnO3 Perovskite Materials", Journal de Physique IV, 1993, pp. 1429-1434, vol. 3, Issue No. 7.
Brunauer, S., et al—"Adsorption of Gases in Multimolecular Layers", The Journal of the American Chemical Society, Feb. 1938, pp. 309-319, vol. 60.

\* cited by examiner

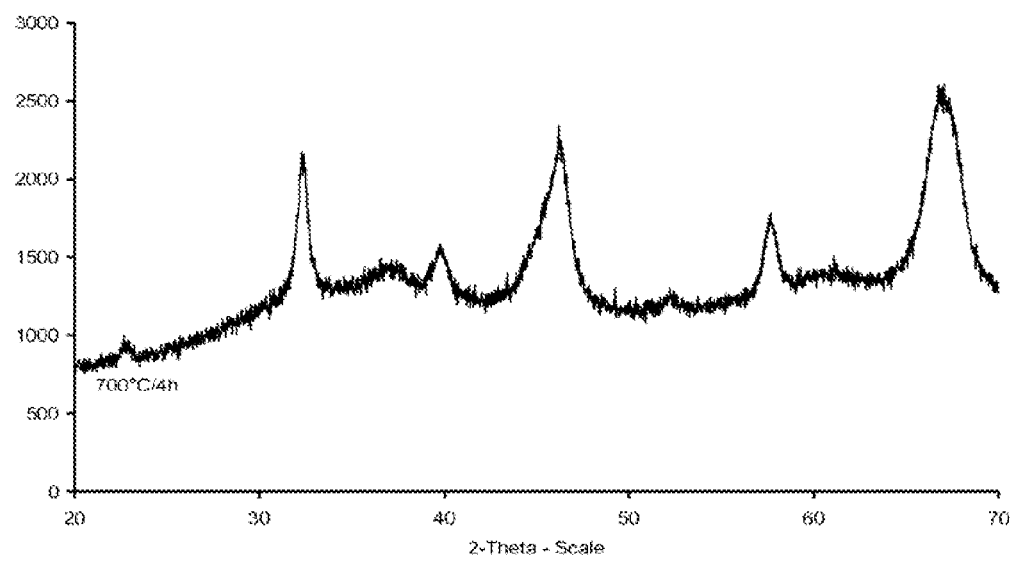

COMPOSITION INCLUDING A LANTHANUM PEROVSKITE ON AN ALUMINA OR ALUMINUM OXYHYDROXIDE SUBSTRATE, PREPARATION METHOD AND USE IN CATALYSIS

This application a continuation of U.S. application Ser. No. 13/254,151, filed Nov. 3, 2011, which is a U.S. national stage entry under 35 U.S.C. § 371 of International Application No. PCT/EP2010/052381, filed Feb. 25, 2010, which in turn claims priority to French Application No. FR 09/00929, filed Mar. 2, 2009. The entire contents of these applications are explicitly incorporated herein by this reference.

The present invention relates to a composition comprising a lanthanum-based perovskite on a support made of alumina or aluminum oxyhydroxide, to its process of preparation and to its use in catalysis.

Perovskites of general formula $ABO_3$ are known to exhibit advantageous properties in the field of catalysis. In this field, they are preferably used in the supported form, so as to increase the surface area for contact between the perovskite and the stream to be treated, for example a gas. The support can in particular be alumina, silica or ceria.

In the case of a supported perovskite, it is important for the perovskite to be dispersed as finely as possible over the support, that is to say that it is provided in the form of fine particles, of nanometric sizes, on the support. In addition, as the catalysts are often exposed to high temperatures, it is also advisable for the finely divided state of the perovskite to be maintained even at these temperatures. In other words, sintering of the perovskite particles should not take place.

Furthermore, at high temperature, the appearance of interfering crystallographic phases other than the pure perovskite phase may also be observed. The formation of these phases may result in a decrease in the catalytic activity of the supported perovskite. A search is thus underway for products capable of retaining a phase purity even at high temperatures.

The subject matter of the invention is the development of compositions meeting these conditions.

To this end, the composition of the invention comprises a perovskite of formula $LaMO_3$ in which M represents at least one element chosen from iron, aluminum or manganese, in the form of particles dispersed over a support based on alumina or aluminum oxyhydroxide, characterized in that, after calcination at 700° C. for 4 hours, the perovskite exists in the form of a pure crystallographic phase and in that the perovskite particles have a size of at most 15 nm.

The compositions of the invention thus have the advantage of exhibiting a perovskite which is both in the finely dispersed form and in the pure crystallographic form.

In addition, the compositions of the invention can exhibit advantageous reducibility properties.

Other characteristics, details and advantages of the invention will become even more fully apparent on reading the description and studying the appended drawing, in which:

FIG. 1 is an XRD diffractogram of a product according to the invention.

The term "rare earth metals" is understood to mean the elements from the group consisting of yttrium and the elements of the Periodic Table with an atomic number between 57 and 71 inclusive.

For the continuation of the description, the term "specific surface" is understood to mean the BET specific surface determined by nitrogen adsorption in accordance with the standard ASTM D 3663-78 drawn up from the Brunauer-Emmett-Teller method described in the periodical "The Journal of the American Chemical Society, 60, 309 (1938)".

In addition, the calcinations for a given temperature and a given time correspond, unless otherwise indicated, to calcinations under air at a stationary temperature level for the time indicated.

It is also specified, for the continuation of the description, that, unless otherwise indicated, in all the ranges or limits of values which are given, the values of the limits are included, the ranges or limits of values thus defined thus covering any value at least equal to or greater than the lower limit and/or at most equal to or lower than the upper limit.

The composition of the invention thus comprises a supported perovskite in the form of particles of nanometric sizes, these particles being deposited on a support made of alumina.

The perovskite corresponds to the formula $LaMO_3$ in which M represents at least one element chosen from iron, aluminum or manganese. The invention thus definitely covers the case where M can represent a combination of two or three of the abovementioned elements.

It is known that the structural stability of perovskites makes possible the partial substitution of the cations A and B by cations with identical or different valencies. For this reason, the invention covers the cases where at least one of the elements La and M of the perovskite is partially substituted by at least one substituent element.

Purely by way of example, the substituent element can be chosen from calcium and rare earth metals. This rare earth metal can more particularly be cerium, yttrium, praseodymium or neodymium.

The substituent element can also be chosen from cobalt and strontium.

Generally, calcium and the rare earth metals are present as substituent for the element La and cobalt arid strontium as substituent for the element M but it will be understood that this attribution of a class of substituents to a substituted element is given only by way of example, that it is not absolute and that it is not ruled out for a substituent given for one element to be able to substitute for another element.

It may be noted that the combinations of the elements M which were mentioned above can be understood as partial substitutions of a first element M by a second element M.

The amount of substituent element can vary in a known way in a range of between 1% and 20% approximately, more particularly between 5% and 15%, this amount being expressed by the substituent element/(substituent element+substituted element) atomic ratio.

The amount of perovskite in the composition can vary within wide limits. This amount can range up to approximately 40% by weight, more particularly approximately 35% by weight and more particularly still approximately 30% by weight of perovskite, with respect to the total weight of the composition.

The minimum content of supported perovskite is that from which a person skilled in the art knows that it is possible to obtain a satisfactory catalytic activity and it is set according to the performance desired for the composition. Purely by way of example, this amount of perovskite can be at least approximately 1% by weight, more particularly at least 5% by weight and more particularly still at least 10% by weight. This amount of perovskite can thus be comprised between any one of the minimum values given above and any one of the maximum values given above in the preceding paragraph. More specifically, this amount can thus be between 5% and 30% by weight and more particularly between 10% and 20% by weight. It may be noted that, for a given supported perovskite, the size of the crystallites generally decreases as the amount of perovskite in the composition decreases.

In a known way, the perovskite can exhibit a deficiency or a shortage of one of the elements La or M. This deficiency can increase the catalytic activity of the perovskite. This deficiency can be in a range extending from 5% to 30%, more particularly from 10% to 20%, with respect to the stoichiometric amount of the element La or Mn in the perovskite not experiencing this shortage.

According to a first characteristic of the invention, the perovskite exists in the form of a pure crystallographic phase even after calcination of the composition at 700° C. for 4 hours.

The purity in the crystallographic sense is demonstrated by the X-ray diffraction (XRD) diagram. The diffraction diagram of the composition, after calcination under the conditions indicated, reveals only, in addition to the crystallographic phase of the alumina or aluminum oxyhydroxide of the support, just the peaks of the perovskite phase. The appearance is not seen of peaks corresponding, for example, to the oxide $La_2O_3$ or to an oxide of the element M.

As indicated above, in the composition of the invention, the perovskite particles are deposited on or dispersed over the support. This is understood to mean that the perovskite particles are predominantly and preferably completely present on the surface of this support, it being understood that the particles can be present inside the pores of the support but while remaining, however, at the surface of these pores.

According to another characteristic of the invention, these particles exhibit a size which is at most 15 nm when the composition has been calcined at 700° C. for 4 hours.

The size values given in the present description are mean sizes determined by the XRD technique. The value measured by XRD corresponds to the size of the coherent domain calculated from the width of the three most intense diffraction lines in the x, y, z space group and by using the Debye-Scherrer model.

Furthermore, it should be noted that the perovskite particles can either be separate and thus composed of a single crystallite or can optionally be in the form of aggregates of several crystallites forming a coherent domain.

According to a preferred embodiment, the particles exhibit a size of at most 10 nm. In the particular case of the perovskites in which M is manganese or aluminum, it being possible for these two elements optionally to be substituted, sizes of at most 5 nm can be obtained. The size values given here are always to be understood for a composition calcined at 700° C. for 4 hours.

Finally, it should be noted that the particles can exhibit a very small minimum size, at the limit of the possibilities of measurement by the XRD technique, for example of the order of 2 to 3 nm, after calcination at 700° C. for 4 hours.

The support of the composition of the invention can be first of all based on alumina. Preferably, this support should exhibit a high and stable specific surface, that is to say a specific surface which remains at a satisfactory value even after exposure to a high temperature.

Use may be made here of any type of alumina capable of exhibiting a specific surface satisfactory for an application in catalysis. Use may thus in particular be made of an alumina exhibiting a specific surface of at least 80 m$^2$/g, preferably of at least 1.00 m$^2$/g, and comprised, for example, between 80 m$^2$/g and 400 m$^2$/g.

Mention may be made of the aluminas resulting from the rapid dehydration of at least one aluminum hydroxide, such as bayerite, hydrargillite or gibbsite, or nordstrandite, and/or of at least one aluminum oxyhydroxide, such as boehmite, pseudoboehmite and diaspore.

The support can also be based on aluminum oxyhydroxide of the abovementioned type also exhibiting an appropriate specific surface, that is to say as described above concerning the alumina.

According to a specific embodiment of the invention, use is made of a stabilized and/or doped alumina or aluminum oxyhydroxide. Mention may be made, as stabilizing and/or doping element, of rare earth metals, titanium, zirconium and silicon. Mention may very particularly be made, among rare earth metals, of cerium, praseodymium, neodymium, lanthanum or the lanthanum/neodymium mixture. In this instance, lanthanum is the preferred rare earth metal. These elements can be used alone or in combination.

It should be noted, for the continuation of the description, that the terms "stabilized", "doped", "stabilizing" or "doping" should be interpreted nonlimitingly, it thus being possible for a doping element to be understood as stabilizing, and vice versa.

The stabilized and/or doped alumina or aluminum oxyhydroxide is prepared in a way known per se, in particular by impregnation of the alumina or aluminum oxyhydroxide with solutions of salts, such as the nitrates, of the abovementioned stabilizing and/or doping elements or also by codrying an alumina or aluminum oxyhydroxide precursor and salts of these elements, followed by calcination.

Furthermore, mention may be made of another preparation of the stabilized alumina in which the alumina powder resulting from the rapid dehydration of an aluminum hydroxide or oxyhydroxide is subjected to a maturing operation in the presence of a stabilizing agent composed of a lanthanum compound and optionally a neodymium compound, it being possible for this compound to be more particularly a salt. The maturing can be carried out by suspending the alumina in water and then heating to a temperature of, for example, between 70 and 110° C. After the maturing, the alumina is subjected to a heat treatment.

The content of stabilizing and/or doping element, expressed as weight of stabilizing oxide with respect to the stabilized and/or doped alumina or aluminum oxyhydroxide, is generally between 1% and 10% approximately.

The compositions of the invention can exhibit perovskite particle sizes which still remain low even at temperatures of greater than 700° C. Thus, after calcination at 900° C. for 4 hours, the perovskite particles exhibit a size of at most 18 nm, more particularly of at most 15 nm. In this case, the particles may exhibit a minimum size which can be approximately at least 5 nm.

After calcination at 1000° C. for 4 hours, the perovskite particles exhibit a size of at most 22 nm, more particularly of at most 15 nm. In this case, the particles may exhibit a minimum size which can be approximately at least 8 nm.

According to preferred embodiments and more particularly with stabilized and/or doped alumina or aluminum oxyhydroxide supports, in particular stabilized and/or doped with lanthanum, it is possible to have compositions in which the perovskite exists in the form of a pure crystallographic phase even after calcination at 900° C. or even at 1000° C. for 4 hours.

In addition to the fact that the compositions of the invention comprise a finely dispersed perovskite, some of them exhibit advantageous reducibility properties. They are compositions for which the element M of the perovskite is iron and/or manganese, it being possible for these elements to be substituted and it being possible for the perovskite to experience a shortage. In this case, the supported perovskite exhibits a greater amount of labile oxygen than the same bulk perovskite, for example at least two times more, indeed even five times more, which is reflected by a higher reductibility of the product.

The process for the preparation of the compositions of the invention will now be described.

This process is characterized in that it comprises the following stages:
- a liquid medium is formed which comprises alumina or aluminum oxyhydroxide and salts of the elements La and M and, if appropriate, of a substituent element, said salts being chosen from acetates, chlorides and nitrates;
- a base is added to the medium thus formed until a pH of at least 9 is obtained, whereby a precipitate is obtained;
- the precipitate is separated from the reaction medium and, in the case of the use in the first stage of chlorides or nitrates as salts of the abovementioned elements, the precipitate is washed;
- the precipitate is calcined.

The first stage of the process thus consists in forming a liquid medium, generally an aqueous medium, which comprises, in the form of a dispersion, alumina or aluminium oxyhydroxide which will act as support in the composition which it is desired to prepare.

According to a preferred alternative form, the alumina or aluminum oxyhydroxide may have been precalcined, for example at a temperature which can be between 500° C. and 700° C., in order to avoid an excessively great variation in the crystallographic characteristics in the continuation of the preparation process.

This liquid starting medium additionally comprises salts of the elements La and M and, in the case of the preparation of compositions in which the elements La and M of the perovskite are substituted, the salts of the substituent elements.

The salts are chosen from the acetates, chlorides and nitrates. The acetates are preferably used if it is desired to obtain the smallest possible crystallite sizes. The chlorides may exhibit the advantage of more easily resulting in compositions in which the perovskite remains in the form of a pure crystallographic phase at 900° C. or 1000° C.

In a second stage of the process of the invention, a base is added to the medium formed in the preceding stage.

Use may be made, as base, of products of the hydroxide, carbonate or basic carbonate type, for example. Mention may be made of alkali metal or alkaline earth metal hydroxides or secondary, tertiary or quaternary amines. However, amines and ammonia may be preferred insofar as they reduce the risks of contamination by alkali metal or alkaline earth metal cations. Mention may also be made of urea.

The base is added until a pH of the reaction medium of at least 9, more particularly of at least 9.5, is obtained.

The operation of bringing into contact with the base results in the formation of a precipitate in suspension in the liquid reaction medium.

The base is preferably added with stirring. The stirring may be maintained after this addition, for example for a time of at least one hour.

On conclusion of this second stage, the precipitate is separated from the liquid medium by any known means.

The precipitate thus obtained can be washed, in particular with pure water or aqueous ammonia solution. It should be noted that washing is not necessary in the case of the use of acetates as starting salts; on the other hand, it is required in the case of the use of chlorides or nitrates, it being possible for the absence of washing in this case to result in compositions in which the perovskite phase is not pure.

The final stage of the process is a calcination stage.

This calcination makes it possible to develop the crystallinity of the supported perovskite and it can also be adjusted and/or chosen as a function of the subsequent operating temperature intended for the composition according to the invention, this being done while taking into account the fact that the specific surface of the product decreases as the calcination temperature employed increases. Such a calcination is generally carried out under air but a calcination carried out, for example, under an inert gas or under a controlled atmosphere (oxidizing or reducing) is very clearly not ruled out.

In practice, the calcination temperature is generally limited to a range of values between 500° C. and 800° C., preferably between 600° C. and 700° C. The calcination time is adjusted in a known way; it can vary, for example, between 30 minutes and 4 hours, this time generally decreasing as the temperature increases.

The compositions of the invention as described above or as obtained by the process described above are provided in the form of powders but they can optionally be shaped in order to be provided in the form of granules, beads, cylinders or honeycombs of variable dimensions.

The compositions of the invention described above or obtained by the process described above can be used as catalysts. Thus, the invention also relates to catalytic systems comprising these compositions. These systems comprise a coating (wash coat), based on these compositions and optionally on a binder of known type and having catalytic properties, on a substrate of the, for example, metal or ceramic monolith type. This coating is obtained by mixing the composition with the binder so as to form a suspension which can subsequently be deposited on the substrate.

These catalytic systems and more particularly the compositions of the invention can have a great many applications. They are thus particularly well suited to, and thus usable in, the catalysis of various reactions, such as, for example, dehydration, hydro-sulfurization, hydrodenitrification, desulfurization, hydrodesulfurization, dehydrohalogenation, reforming, steam reforming, cracking, hydrocracking, hydrogenation, dehydrogenation, isomerization, dismutation, oxychlorination, dehydrocyclization of hydrocarbons or other organic compounds, oxidation and/or reduction reactions, the Claus reaction, the treatment of exhaust gases from internal combustion engines, in particular in automobile after burning and in particular three-way catalysis, demetallation, methanation, the shift conversion or the catalytic oxidation of the soot emitted by internal combustion engines, such as diesel engines or gasoline engines operating under lean burn conditions. Finally, the catalytic systems and the compositions of the invention can be used as catalysts for the selective reduction of NO, by a reaction for the reduction of these $NO_2$ by any reducing agent of the hydrocarbon type or also by ammonia or urea and, in this case, as catalysts for the reaction for the hydrolysis or decomposition of urea to give ammonia (SCR process).

Finally, the compositions of the invention can also be used in treatments for the purification of the air in the case of an air comprising at least one compound of the carbon monoxide, ethylene, aldehyde, amine, mercaptan or ozone type and generally of the type of the volatile organic compounds or atmospheric contaminants, such as fatty acids, hydrocarbons, in particular aromatic hydrocarbons, and nitrogen oxides (for the oxidation of NO to $NO_2$), and of the malodorous compounds type. Mention may more particularly be made, as compounds of this sort, of ethanediol, valeric acid and trimethylamine.

In the case of these uses in catalysis, the compositions of the invention can be employed in combination with precious metals or also transition metals in the oxide, sulfide or other form and they thus act as support for these metals. The nature of these metals and the techniques for incorporating the latter in the support compositions are well known to a person skilled in the art. For example, the metals can be gold, silver, platinum, rhodium, palladium or iridium, molybdenum, tungsten, nickel, cobalt, manganese, copper, titanium or vanadium; they can be used alone or in combination and they can in particular be incorporated in the compositions by impregnation.

For the treatment of exhaust gases, the abovementioned systems are fitted in a known way in the exhaust mufflers of motor vehicles.

Examples will now be given.

COMPARATIVE EXAMPLE 1

This comparative example relates to the preparation of an unsupported bulk perovskite based on lanthanum and iron ($LaFeO_3$).

For this, 20.32 g of iron nitrate, 30.24 g of a 2.785 mol·l$^{-1}$ lanthanum nitrate solution and 63.69 g of citric acid are mixed. 20 ml of water are instantaneously added and mixing is carried out at ambient temperature for 20 minutes. Heating is carried out until a gel is obtained, which gel is subsequently placed in an oven at 120° C. for 12 hours.

The solid obtained is ground and then calcined under air at 700° C. for 2 hours.

EXAMPLE 1

This example relates to the preparation according to the process of the invention of a composition based on a lanthanum iron perovskite ($LaFeO_3$) dispersed over a doped alumina support comprising 6% of lanthanum in the respective proportions of perovskite and support, as weight of oxide, of 10% and 90%.

A solution comprising lanthanum-doped alumina and iron acetate and lanthanum acetate salts is prepared beforehand. For this, 2.26 g of iron acetate are diluted in 75 ml of water and 4.46 g of lanthanum acetate are diluted in 75 ml of water. These solutions are mixed and the mixture thus obtained exhibits a pH of 5.4. Moreover, a dispersion comprising 27 g of doped alumina, precalcined at 700° C. for 2 hours under air, with a specific surface of 180 m/g, dispersed in 150 ml of water is prepared. The solution of iron acetate and of lanthanum acetate is added to the alumina dispersion in order to obtain a liquid mixture comprising lanthanum-doped alumina and iron acetate and lanthanum acetate salts. 11.3 g of a 28% $NH_4OH$ solution are added to this mixture so that the final pH reaches 10; the formation of a precipitate is observed. The precipitate obtained is kept stirred at ambient temperature for 1 h 30. This precipitate is filtered off on a Büchner funnel.

The powder obtained is calcined under air at 700° C. for 4 hours.

FIG. 1 is the XRD diffractogram produced from the powder thus obtained. This FIGURE reveals a pure perovskite phase.

EXAMPLE 2

This example relates to the preparation according to the process of the invention of a composition based on a lanthanum iron perovskite which is substoichiometric in lanthanum ($La_{0.9}FeO_3$) and which is dispersed over the same alumina support as that of example 1 and in the respective proportions of perovskite and of support, as weight of oxide, of 10% and 90%.

2.4 g of iron acetate are diluted in 75 ml of water and 4.25 g of lanthanum acetate are diluted in 75 ml of water. These solutions are mixed and the mixture thus obtained exhibits a pH of 5.5. Moreover, a dispersion comprising the same amount of alumina of example 1 is prepared. The solution of iron acetate and of lanthanum acetate is added to the alumina dispersion. 10 g of sodium hydroxide are subsequently added to the mixture thus obtained, so that the final pH reaches 10 and the formation of a precipitate is observed. The precipitate obtained is kept stirred for 1 h 30. This precipitate is filtered off on a Büchner funnel.

The powder obtained is calcined under air at 700° C. for 4 hours.

The XRD diagram produced from the powder thus obtained reveals a pure perovskite phase.

EXAMPLE 3

This example relates to the preparation according to the process of the invention of a composition based on a lanthanum iron perovskite doped with cerium and with calcium ($La_{0.9}Ce_{0.05}Ca_{0.05}FeO_3$), dispersed on the same alumina support as that of example 1 and in respective proportions of perovskite and of support, as weight of oxide, of 10% and 90%.

On the one hand, 4.09 g of lanthanum acetate, 0.22 g of cerium acetate and 0.11 g of calcium acetate are diluted in 75 ml of water and, on the other hand, 2.31 g of iron acetate are diluted in 75 ml of water. These solutions are mixed in order to obtain an acetate mixture at a pH of 5.5. Moreover, a dispersion comprising the same amount of alumina of example 1 is prepared. The solution of iron acetate, cerium acetate, calcium acetate and lanthanum acetate is added to the alumina dispersion. 14 g of sodium hydroxide are subsequently added to the mixture thus obtained, so that the final pH reaches 10 and the formation of a precipitate is observed. The precipitate obtained is kept stirred for 1 h 30. This precipitate is filtered off on a Büchner funnel.

The powder obtained is calcined under air at 700° C. for 4 hours.

The XRD diagram produced from the powder thus obtained reveals a pure perovskite phase.

EXAMPLE 4

This example relates to the preparation according to the process of the invention of a composition based on a lanthanum iron perovskite ($LaFeO_3$) dispersed over an alumina support in the respective proportions of perovskite and of support, as weight of oxide, of 10% and 90%.

1.36 g of iron chloride are diluted in 50 ml of water and 6.17 g of lanthanum chloride are diluted in 50 ml of water. These solutions are mixed and the mixture thus obtained exhibits a pH of 2. Moreover, a dispersion comprising 18 g of alumina (obtained from a boehmite calcined at 700° C. for 2 hours) dispersed in 100 ml of water is prepared. The solution of iron chloride and lanthanum chloride is added to the alumina dispersion. 9.9 g of a 28% $NH_4OH$ solution are added to the mixture thus obtained, so that the final pH reaches 10; the formation of a precipitate is observed. The precipitate obtained is kept stirred for 1 h 30. This precipitate is filtered off on a Büchner funnel and washed 8 times at the same volume.

The powder obtained is calcined under air at 700° C. for 4 hours.

The XRD diagram produced from the powder thus obtained reveals a pure perovskite phase.

The XRD diagram produced from this same powder but calcined at 900° C. for 4 hours or calcined at 1000° C. for 4 hours reveals a pure perovskite phase in both cases.

EXAMPLE 5

This example relates to the preparation of the same composition as that of example 4 but by a process employing nitrates.

3.35 g of iron nitrate are diluted in 50 ml of water and 4.98 g of lanthanum nitrate are diluted in 50 ml of water. 9.7 g of a 28% $NH_4OH$ solution are added to the same alumina dispersion as that of example 4, so that the final pH reaches 10; the formation of a precipitate is observed. The precipitate obtained is kept stirred for 1 h 30. This precipitate is filtered off on a Büchner funnel and washed 7 times at the same volume.

The powder obtained is calcined under air at 700° C. for 4 hours.

The XRD diagram produced from the powder thus obtained reveals a pure perovskite phase.

EXAMPLE 6

This example relates to the preparation according to the process of the invention of a composition based on a lanthanum manganese perovskite ($LaMnO_3$) dispersed over an alumina support in the respective proportions of perovskite and of support, as weight of oxide, of 10% and 90%.

3.04 g of manganese acetate are diluted in 75 ml of water and 4.47 g of lanthanum acetate are diluted in 75 ml of water. These solutions are mixed and the mixture thus obtained exhibits a pH of 7.2. Furthermore, a dispersion comprising 27 g of alumina, precalcined under air at 700° C. for 2 hours, dispersed in 150 ml of water is prepared. The mixture of manganese acetate and lanthanum acetate is added to the alumina dispersion. 9.5 g of a 28% $NH_4OH$ solution are subsequently added to the medium thus obtained, so that the final pH reaches 10; the formation of a precipitate is observed. The precipitate obtained is kept stirred at ambient temperature for 30 minutes. This precipitate is filtered off on a Büchner funnel.

The powder obtained is calcined under air at 700° C. for 4 hours.

The XRD diagram produced from the powder thus obtained reveals a pure perovskite phase.

EXAMPLE 7

This example relates to the preparation according to the process of the invention of a composition based on the same perovskite and on the same support as those of example 6 but in the respective proportions of perovskite and of support, as weight of oxide, of 20% and 80%.

6.08 g of manganese acetate are diluted in 75 ml of water and 8.94 g of lanthanum acetate are diluted in 75 ml of water. These solutions are mixed and the mixture thus obtained exhibits a pH of 7.2. This mixture is added to the same alumina dispersion as that of example 6. 9.5 g of a 28% $NH_4OH$ solution are subsequently added to the medium thus obtained, so that the final pH reaches 10; the formation of a precipitate is observed. The precipitate obtained is kept stirred at ambient temperature for 60 minutes. This precipitate is filtered off on a Büchner funnel.

The powder obtained is calcined under air at 700° C. for 4 hours.

The XRD diagram produced from the powder thus obtained reveals a pure perovskite phase.

The sizes of the perovskite particles in the compositions of each of the examples according to the invention, after calcination of the compositions at the temperatures indicated for 4 hours, are given in table 1 below.

TABLE 1

| | Sizes of the particles (nm) as a function of the temperature | | |
|---|---|---|---|
| Example | 700° C. | 900° C. | 1000° C. |
| 1 | 8 | 9 | 12 |
| 2 | 9 | 11 | 12 |
| 3 | 9 | 11 | 12 |
| 4 | 12 | 14 | 20 |
| 5 | 8 | 13 | 20 |
| 6 | 3 | 8 | 30 |
| 7 | 10 | 16 | 20 |

The results of the measurements of reducibility of the compositions according to the comparative examples and according to the invention are given in table 2 below.

The reducibility is measured by temperature-programmed reduction in the following way.

Use is made of a Micromeritics Autochem 2920 device with a quartz reactor and a 200 mg sample of product which has been precalcined under air at 700° C. for 6 hours.

The gas is hydrogen at 10% by volume in argon and with a flow rate of 25 ml/min. The temperature rise takes place from ambient temperature to 900° C. at the rate of 20° C./min. The signal is detected with a thermal conductivity detector. The temperature is measured in the sample using a thermocouple.

The hydrogen consumption is calculated from the missing area of the hydrogen signal from the baseline at 30° C. to the baseline at 900° C. This hydrogen consumption, with respect to the weight of the perovskite phase, which characterizes the reducibility properties of the products tested, is given in table 2.

TABLE 2

| Example | $H_2$ volume in ml/g of perovskite |
|---|---|
| 1 | 47.6 |
| 2 | 49.4 |
| 3 | 53.2 |
| 4 | 44.9 |
| 5 | 65.1 |
| 6 | 51.8 |
| 7 | 62.0 |
| Comparative 1 | 8.5 |

It is apparent that the supported perovskite of the compositions of the invention indeed exhibits markedly improved reducing properties, it being possible for the reducibility thus to be 5 times greater in the case of example 1, with respect to comparative example 1, for perovskites with the same composition.

The invention claimed is:
1. A calcined composition comprising:

a perovskite of formula LaMO$_3$ in which M represents at least one element chosen from iron, aluminum or manganese in the form of particles, wherein at least one of the elements La and M of the perovskite is optionally substituted with a substituent element, and a support based on alumina or aluminum oxyhydroxide precalcined at a temperature not less than 500° C. and not greater than 700° C., wherein the perovskite particles are dispersed over the support, and wherein, after calcination at 700° C. for 4 hours, the perovskite exists in the form of a pure crystallographic phase and the perovskite particles have a size of at most 15 nm.

2. The composition as claimed in claim 1, wherein the particles exhibit a size of at most 10 nm.

3. The composition as claimed in claim 1, wherein the amount of perovskite in the composition is between 5% and 30% by weight.

4. The composition as claimed in claim 1, wherein at least one of the elements La and M of the perovskite is partially substituted by at least one substituent element.

5. The composition as claimed in claim 4, wherein the substituent element for La is chosen from rare earth metals and calcium and the substituent element for M is chosen from cobalt or strontium.

6. The composition as claimed in claim 1, wherein the perovskite exhibits a deficiency of one of the elements La or M.

7. The composition as claimed in claim 1, wherein, after calcination at 900° C. for 4 hours, the perovskite particles exhibit a size of at most 18 nm.

8. The composition as claimed in claim 1, wherein, after calcination at 1000° C. for 4 hours, the perovskite particles exhibit a size of at most 22 nm.

9. The composition as claimed in claim 7, wherein the perovskite exists in the form of a pure crystallographic phase.

10. The composition as claimed in claim 1, wherein the alumina or aluminum oxyhydroxide of the support is stabilized and/or doped with at least one stabilizing element chosen from rare earth metals, titanium, zirconium and silicon.

11. A catalytic system comprising a composition as claimed in claim 1.

12. The composition as claimed in claim 3, wherein the amount of perovskite is between 10% and 20% by weight.

13. The composition as claimed in claim 7, wherein the perovskite particles exhibit a size of at most 15 nm.

14. The composition as claimed in claim 13, wherein the perovskite exists in the form of a pure crystallographic phase.

15. The composition as claimed in claim 8, wherein the perovskite exists in the form of a pure crystallographic phase.

* * * * *